United States Patent [19]

Jackson et al.

[11] 4,224,787

[45] Sep. 30, 1980

[54] APPARATUS FOR FORMING DIELECTRIC OPTICAL WAVEGUIDE CABLES

[75] Inventors: Lynden A. Jackson; Roger J. Bates, both of Ipswich, England

[73] Assignee: The Post Office, London, England

[21] Appl. No.: 8,052

[22] Filed: Jan. 31, 1979

[30] Foreign Application Priority Data

Feb. 1, 1978 [GB] United Kingdom ............... 4109/78

[51] Int. Cl.³ .................. B65H 77/00; B65H 81/06; B65H 81/08
[52] U.S. Cl. ............................................ 57/15; 57/31
[58] Field of Search ..................... 57/3, 6, 15, 16, 17, 57/31

[56] References Cited

U.S. PATENT DOCUMENTS

| 1,989,135 | 1/1935 | French et al. ........................ 57/15 |
| 2,362,665 | 11/1944 | Reynolds ............................ 57/15 |
| 2,921,427 | 1/1960 | Stark et al. ......................... 57/15 |
| 3,538,697 | 11/1970 | Hornov et al. ........................ 57/6 |

Primary Examiner—Donald Watkins
Attorney, Agent, or Firm—Kemon & Estabrook

[57] ABSTRACT

Apparatus for winding tape around an elongate core comprises a frame structure which supports one or more reels of tape. The frame structure carries a bobbin which is rotatable with the frame structure about the core. Tape passes from the reel to the bobbin and extends between a pair of contacts before passing through a slit to the core. The contacts are normally open but if the tape touches one of these that contact closes and the speed of the motor, which drives the frame structure is adjusted to maintain the tape between the contacts. This arrangement ensures a substantially constant pitch of the tape around the core.

8 Claims, 4 Drawing Figures

APPARATUS FOR FORMING DIELECTRIC OPTICAL WAVEGUIDE CABLES

DESCRIPTION

This invention relates to apparatus for winding tape around an elongate core structure. The apparatus has particular application in the production of dielectric optical waveguide cables.

In U.S. Application Ser. No. 835,440 filed Sept. 21, 1977, now abandoned there is described a dielectric optical waveguide cable having a core structure comprising a plurality of axially extending fibres some of which incorporate dielectric optical waveguides and others of which incorporate strength members, and an outer sheath surrounding the core structure. The outer sheath includes two layers of tape which are wound around the core structure. Each layer is wound spirally and has an opposite sense to that of the other layer. Each layer comprises two adjacent lengths of corrugated tape one of which partially overlaps the other so that the corrugations interengage and each layer is wound such that the under length of tape of one turn almost contacts the under length of tape of the next turn, the small gap therebetween being overlaid by the upper length of tape.

It is important that the corrugated tape is wound such that the corrugations interengage along the length of the cable. Since the width of the corrugations is constant there are only certain pitches which can be used for the spiral winding and these pitches must be maintained accurately during the winding procedure. Apparatus for winding the tape around the core structure should therefore have a winding bobbin which spins around the core structure in synchronism with the rate of longitudinal movement of the core structure past the bobbin. The majority of fixed speed drive mechanisms cannot provide the degree of precision which is required and furthermore they cannot make adjustments for any changes in core structure diameter along its length.

We provide a winding apparatus in which the winding bobbin has a pair of spaced sensors between which the tape is arranged to pass, the sensors being connected to control means for drive means which drive the bobbin such that the rotational speed of the bobbin is adjusted to maintain the tape between the sensors. In this way the bobbin is made to rotate around the core structure in synchronism with the rate at which the core structure moves past the bobbin.

According to the present invention there is provided apparatus for winding tape around an elongate core comprising a frame structure rotatable about an axis, said structure defining an axially extending passage for said core to pass along, a bobbin carried by said structure and mounted so as to be rotatable about the path of said core, means for mounting a reel of tape on said structure, and means for guiding tape from said reel to said bobbin, said bobbin including a pair of spaced sensors between which the tape is arranged to pass, said sensors being connected to control circuitry for drive means for said frame structure, said control circuitry being operative to control the drive means such that the tape is maintained between the sensors.

Each sensor may comprise a normally open electrical contact which is arranged to be closed in response to pressure from said tape, closure of one of said contacts resulting in an increase in speed of the drive means and closure of the other contact resulting in a decrease in the speed.

The apparatus may have two axially spaced, rotatable frame structures one of which is arranged to rotate in one sense and the other of which is arranged to rotate in the opposite sense.

The guide means may include means allowing adjustment of the orientation of the tape relative to the bobbin.

The invention will be described now by way of example only with particular reference to the accompanying drawings. In the drawings.

Figure 1:
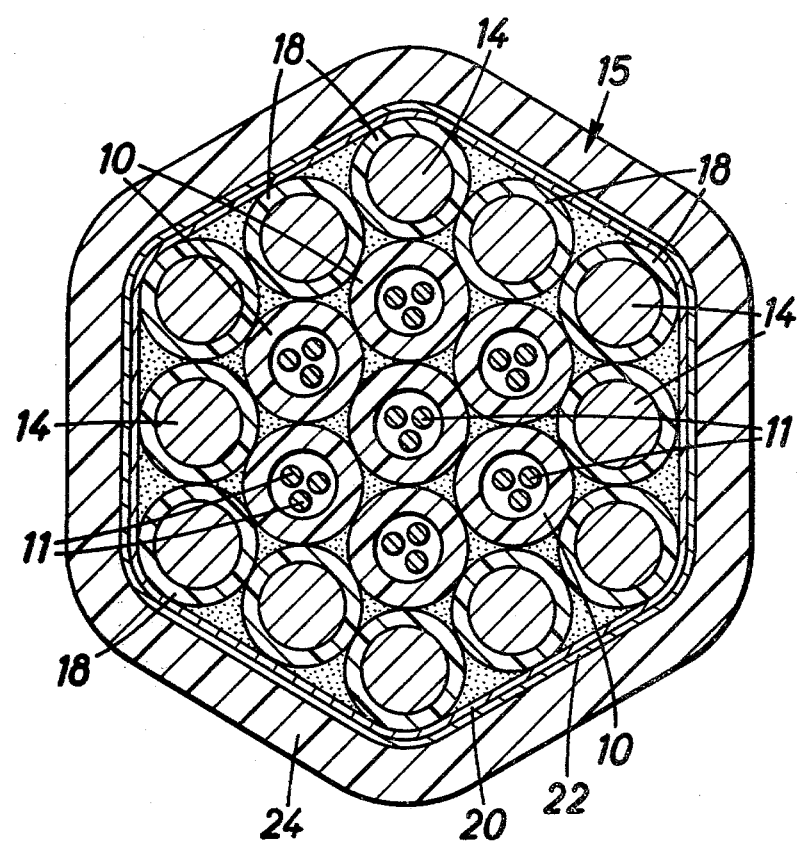
FIG. 1 is a cross-section through a dielectric optical waveguide cable which can be formed by apparatus in accordance with the present invention.

The dielectric optical waveguide cable shown in FIG. 1 comprises seven centrally located, axially extending polypropylene sleeves 10 each of which houses three dielectric optical waveguides 11; twelve axially extending filamentary strength members 14 disposed around the centrally located sleeves 10, and an outer sheath 15 surrounding the sleeves 10 and strength members 14.

Each polypropylene sleeve 10 is produced by the extrusion method described in British Patent Application No. 20345/75. The sleeves produced by this method have their molecules orientated to lie longitudinally of the sleeve. Such sleeves have relative strength in a longitudinal plane and relative weakness in a transverse plane.

Each strength member 14 is accommodated within a polypropylene sleeve 18, each sleeve 18 being made by the same process and being of similar form and diameter to the sleeves 10. It is envisaged that a wide range of materials could be used for the strength members 14. Materials at present under consideration are stranded steel, Kevlar 49 polymer twists and glass fibre rovings. It is also envisaged that if a very high modulus orientated polymer sleeve 18 were to be developed it could serve as the strength member itself without any material therein.

The interstices of the sleeves 10 and the sleeves 18 are filled with petroleum jelly to prevent ingress of water. A flexible or semi-flexible epoxy could be used instead of the petroleum jelly if a greater degree of retention for the sleeves 10, 18 within the sheath 15 is required.

The outer sheath 15 comprises an inner first layer 20 formed from corrugated Mylar tape, a second layer 22 also formed from corrugated Mylar tape and an outer sheath portion 24 formed of extruded polyethylene. The inner layer 20 is formed by winding two lengths of corrugated Mylar tape which are arranged to partially overlap so that their corrugations interlock in a spiral around the group of sleeves 10 and 18 so that it has a left hand lay. The arrangement is such that the under length of tape of one turn almost contacts the under length of tape of the next turn, the small gap therebetween being overlaid by the over length of tape. The second layer 22 is formed by winding two similar lengths of Mylar tape over the first layer in a spiral with a right hand lay. Typically the thickness of the Mylar tape is 50 microns and the depth of the corrugations in each tape is 250 microns. Each length of tape can have a width of approximately 8mm. The outer sheath portion 24 can be extruded by conventional techniques.

The arrangement of the two layers 20 and 22 has a hoop strength which is relatively high. Furthermore, because the second layer is wound in an opposite sense to that of the first layer a very effective heat barrier is formed. The outer polyethylene sheath portion 24 keys to the second layer of corrugated Mylar tape. The two tape layers can slide easily over each other and hence allow for some contraction of the outer sheath portion during the extrusion process.

The optical waveguide cable provides a relatively high signal carrying capacity for a relatively small size. The use of filamentary strength members gives the cable good flexibility. The cable is relatively easy to make and it can be modified easily to allow for any improvements in the strength of dielectric optical waveguides which may be made in the future. For example, it is envisaged that as the strength of optical waveguides is improved it may be possible to replace the strength members with optical waveguides. Furthermore, the optical waveguides lie axially along the cable thereby keeping to a minimum micro-bending problems.

Figure 2:
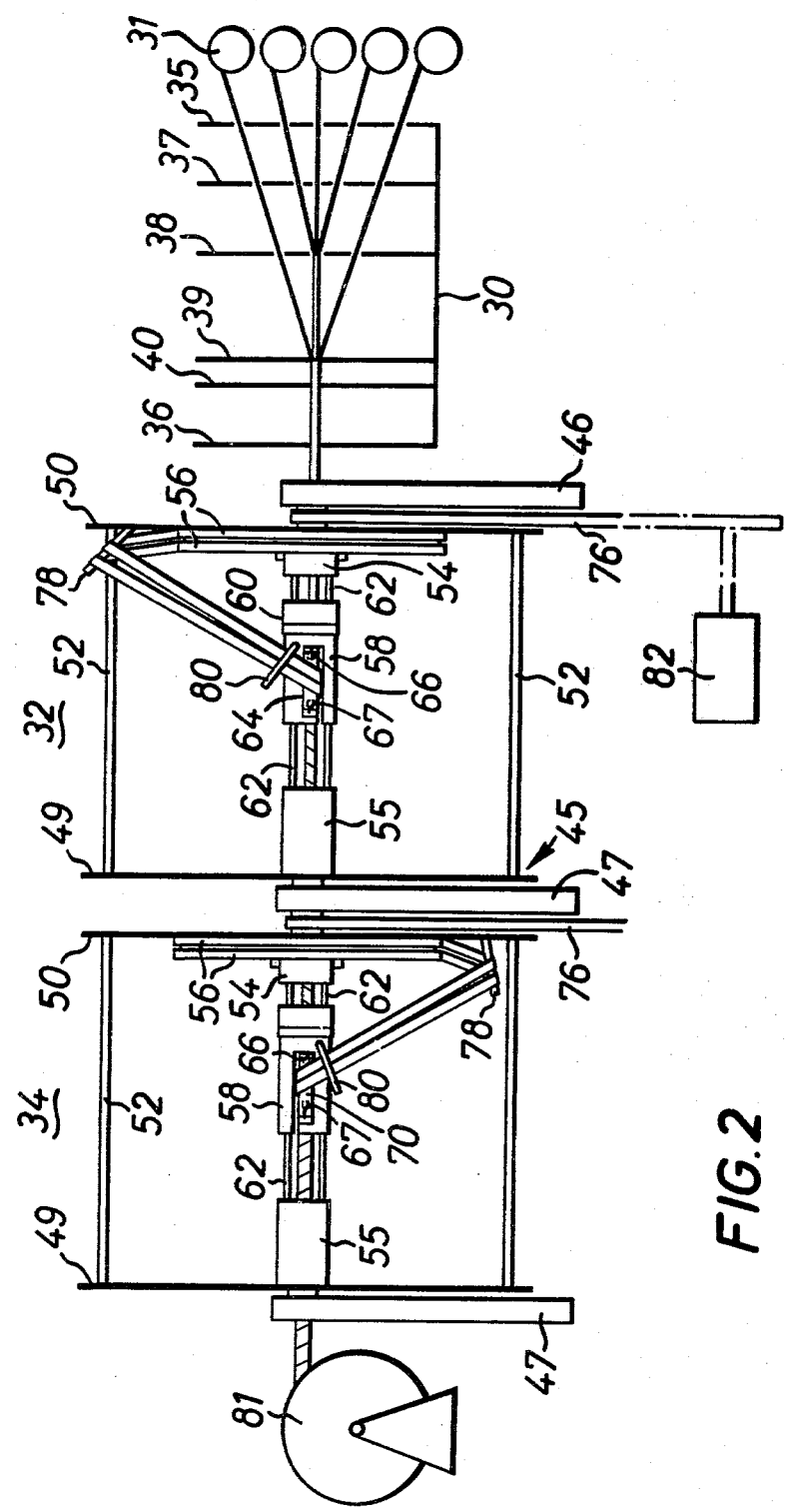
FIG. 2 is a schematic illustration of apparatus in accordance with the present invention.

Apparatus for winding the layers 20 and 22 around the core structure is illustrated in FIG. 2. The apparatus comprises a first stage consisting of a tank 30 having spaced along its length a number of plates which are used to bring together the individual fibres in order to form the core structure. The apparatus has a second stage consisting of winding station 32 positioned axially beyond the tank 30. A third stage consisting of further winding station 34 is positioned axially beyond the first winding station 32.

The tank 30 has first and second end plates 35, 36 and four further plates 37 to 40 disposed at axially spaced locations between the end plates 35 and 36. The end plate 35 and the plate 37 adjacent thereto each have a plurality of substantially equally spaced holes through which individual fibres, i.e. sleeves containing optical fibres and sleeves containing strength members, can pass from nineteen reels 31 on which the fibres are wound. The plate 38 has a central aperture through which all the optical fibres are arranged to pass and a plurality of further apertures spaced around the central aperture through which the strength member fibres pass. The plate 39 has a single substantially central aperture through which all the fibres pass to form a core structure consisting of a plurality of centrally located sleeves containing optical fibres surrounded by a plurality of strength member fibres. The plate 40 and the end plate 36 each have a central aperture through which the core structure can pass. The tank 30 can contain petroleum jelly for filling the interstices of the sleeves 10 and the sleeves 18.

Figure 3:
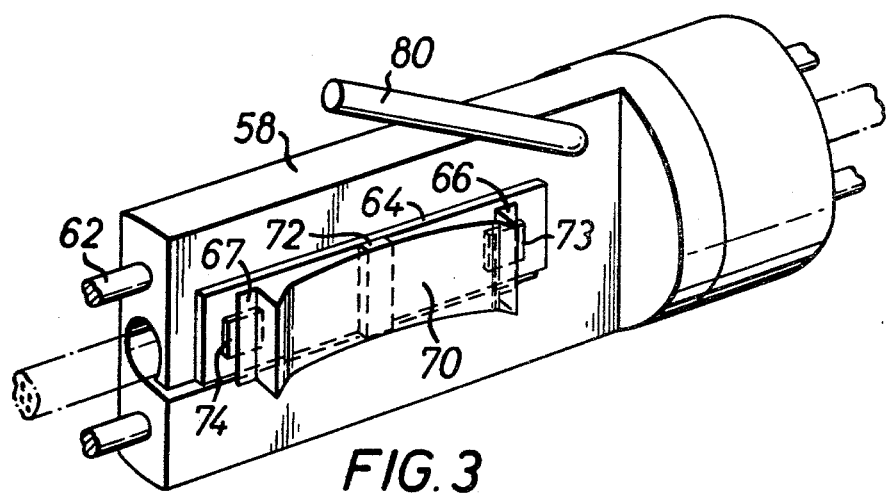
FIG. 3 is a more detailed view of part of the apparatus of FIG. 2.

The first winding station has a rotatable frame 45 which is mounted on suitable bearings between two support posts 46 and 47. The rotatable frame comprises a pair of spaced discs 49, 50 which are mounted in axially spaced relationship by four rods 52 extending axially between peripheral points on the discs. Each disc carries an axially extending boss 54, 55. The boss 55 has mounted thereon two adjacent reels of tape 56 which are to be wound onto the core structure. In between the bosses there is mounted a bobbin 58. The bobbin 58 is generally planar and has a circular flange 60 at its end nearest to the disc 50. The bobbin is connected at each of its ends to the bosses 54, 55 by axially extending rods 62. The planar portion of the bobbin extends diametrically of the flange 60. The bobbin 58 has an axial central through aperture and a longitudinally extending slit 61 is formed in the planar portion to communicate with the central through aperture (see also FIG. 3). Thus when the discs are rotated the slit in the planar portion of the bobbin executes a circular orbit around the axis of the discs. The discs 49, 50 and the bosses 54, 55 each have a through bore which provide a passage for the core structure from the tank 30.

Figure 4:
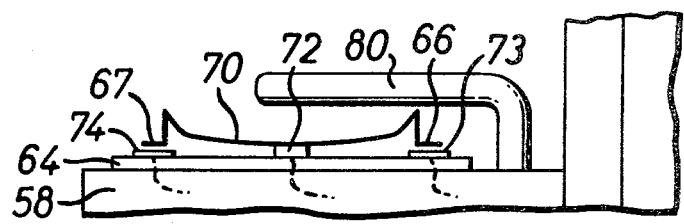
FIG. 4 shows a detail of another part of the apparatus of FIG. 2.

One face of the planar portion of the bobbin 58 carries a strip 64 adjacent the slit 61. The strip 64 is formed from insulating material and mounted on the strip are a pair of spaced electrical contacts 66, 67. The electrical contacts 66 and 67 are illustrated in more detail in FIG. 4. As shown in FIG. 4 the contacts are formed at each end of a resilient metal strip 70 which is secured to the insulating member 64 at 72. The opposite ends of the strip 70 are in the shape of an inverted V and are normally located above and spaced from contact elements 73, 74 which are mounted on the strip 64. The contacts 66, 67 can be closed by pressing down on the respective V shaped portions of the strip 70. The contact elements 73, 74 are connected via slip rings to a circuit with control means for a servo controlled electric motor 82 which is arranged to drive the rotatable frame 45 by means of a belt 76. The arrangement is such that if both contacts 66, 67 are open as shown in FIG. 4, the motor when energised rotates the rotatable frame 45 at a substantially constant rate. If one of the contacts is closed the control means for the motor operates to either increase or decrease the speed of the motor depending upon which contact element is closed. Closure of one contact causes a decrease in the speed of the motor and closure of the other contact causes an increase in the speed of the motor. This results in a corresponding variation in the speed of rotation of the frame 45. The motor and its associated control are well known and commercially available.

Tape from each of the reels 56 is fed over a guide pin 78 carried near the periphery of the disc 50 and over another guide pin 80 mounted on the planar portion of the bobbin 58. The pin 80 is so mounted that its orientation relative to the bobbin can be adjusted. Intermediate the pins 78 and 80 the two portions of tape are brought together so that they partially overlap and some of their corrugations interengage. From the guide pin 80 the tape passes over and in contact with the face of the planar portion of the bobbin 58 intermediate the two electrical contacts 66, 67. The tape then passes through the slit 61 and is wound around the core structure of the cable which has passed from the tank 30.

The second winding station 34 is similar to the first winding station 32. Elements of this station corresponding to those of the first station are indicated by like reference numerals. The main difference is that the rotatable frame of the second station is arranged to rotate in the opposite sense to that of the first station and the positioning of its bobbin is modified accordingly.

In operation the core structure is pulled through from the tank 30 by means of a rotating haul-off drum 80 (not shown) disposed beyond the second winding station 34. As the core structure passes through the first winding station 34 the frame 45 rotates so that the bobbin 58 rotates around the core structure and tape is wound in a spiral onto the core structure. The pitch of the spiral lay of the tape on the core structure is determined before-hand by appropriately setting the position of the two tape guide pins 78 and 80. It is important that once the winding operation has started that the speed of rotation of the bobbin 58 around the core structure should remain in synchronism with the rate at which the core structure is pulled through the winding station. This is achieved by means of the arrangement of contacts 66, 67 connected to the control means for the motor which provides the drive to rotate the frame structure 45. If the speed of rotation of the frame 45 should vary the tape passing over the face of the bobbin moves along the bobbin relative to the contacts. If the tape moves into contact with one of the contacts, that contact is closed and the speed of the motor is adjusted to change the speed of rotation of the drum so that the tape moves back to a position intermediate the contacts 66 and 67. Thus is will be seen that the motor can be alternately slowed down or speeded up in order to maintain the rotational speed of the bobbin 58 in synchronism with the rate at which the core structure is pulled through the winding station. The second winding station 34 operates in a substantially identical manner the only difference being that the tape from the second winding station is layed in a sense which is opposite to that of the first station.

The cable produced by this process has the following advantages.

1. Relatively small wrapping tensions are required in order to lock the core structure especially in subsequent bending of the cable.

2. The combination of the two layers of corrugated tape of opposite lay gives an air gap therebetween which assists thermal insulation of the core structure during the sheathing process.

3. During sheathing, contraction of the sheath during cooling inevitably results is some relative movement of the sheath and core. The point contact between the inner and outer corrugated layers allows a low friction sliding contact.

A further although relatively minor point is that should a water barrier be needed in the cable the tapes may be metallised and because of their corrugated nature a better water barrier is obtained than would be the case with a flat tape.

It will thus be seen that the present apparatus can be used to wrap the corrugated tape around the core structure of the cable in such a manner that the required pitch of the tape is accurately maintained. In addition to providing limit control each bobbin 58 also supports the core structure at the point where the tape is supplied. This allows for low cable tensions during manufacture.

We Claim:

1. Apparatus for winding tape around an elongate core comprising a frame structure rotatable about an axis, said structure defining an axially extending passage for said core to pass along, a bobbin carried by structure and mounted so as to be rotatable about the path of said core, means for mounting a reel of tape on said structure and means for guiding tape from said reel to said bobbin, said bobbin including a pair of spaced sensors between which the tape is arranged to pass, said sensors being connected to control circuitry for drive means for said frame structure, said control circuitry being operative to control the drive means such that the tape is maintained between the sensors.

2. Apparatus as claimed in claim 1 wherein each sensor comprises a normally open electrical contact which is arranged to be closed in response to pressure from the tape, closure of one of said contacts resulting in an increase in speed of the drive means, and closure of the other contact resulting in a decrease in the speed.

3. Apparatus as claimed in claim 1 or claim 2 wherein said bobbin has a central through aperture for said core, and includes a planar portion which carries said sensors, said planar portion including a longitudinally extending slit which communicates with said aperture.

4. Apparatus as claimed in claim 1 wherein said guide means includes means allowing adjustment of the orientation of the tape relative to the bobbin.

5. Apparatus as claimed in claim 4 wherein said guide means includes a guide pin mounted on the planar portion of the bobbin so that its orientation relative to the bobbin can be adjusted.

6. Apparatus for winding tape around an elongate core comprising two axially spaced rotatable frame structures as claimed in claim 1.

7. Apparatus as claimed in claim 6 wherein one frame structure is arranged to rotate in one sense and the other is arranged to rotate in the opposite sense.

8. Apparatus for forming a dielectric optical waveguide cable comprising means for guiding a plurality of optical waveguides and strength members together to form an elongate core and apparatus as claimed in claim 7 arranged to receive said elongate core.

* * * * *